Patented Feb. 6, 1934

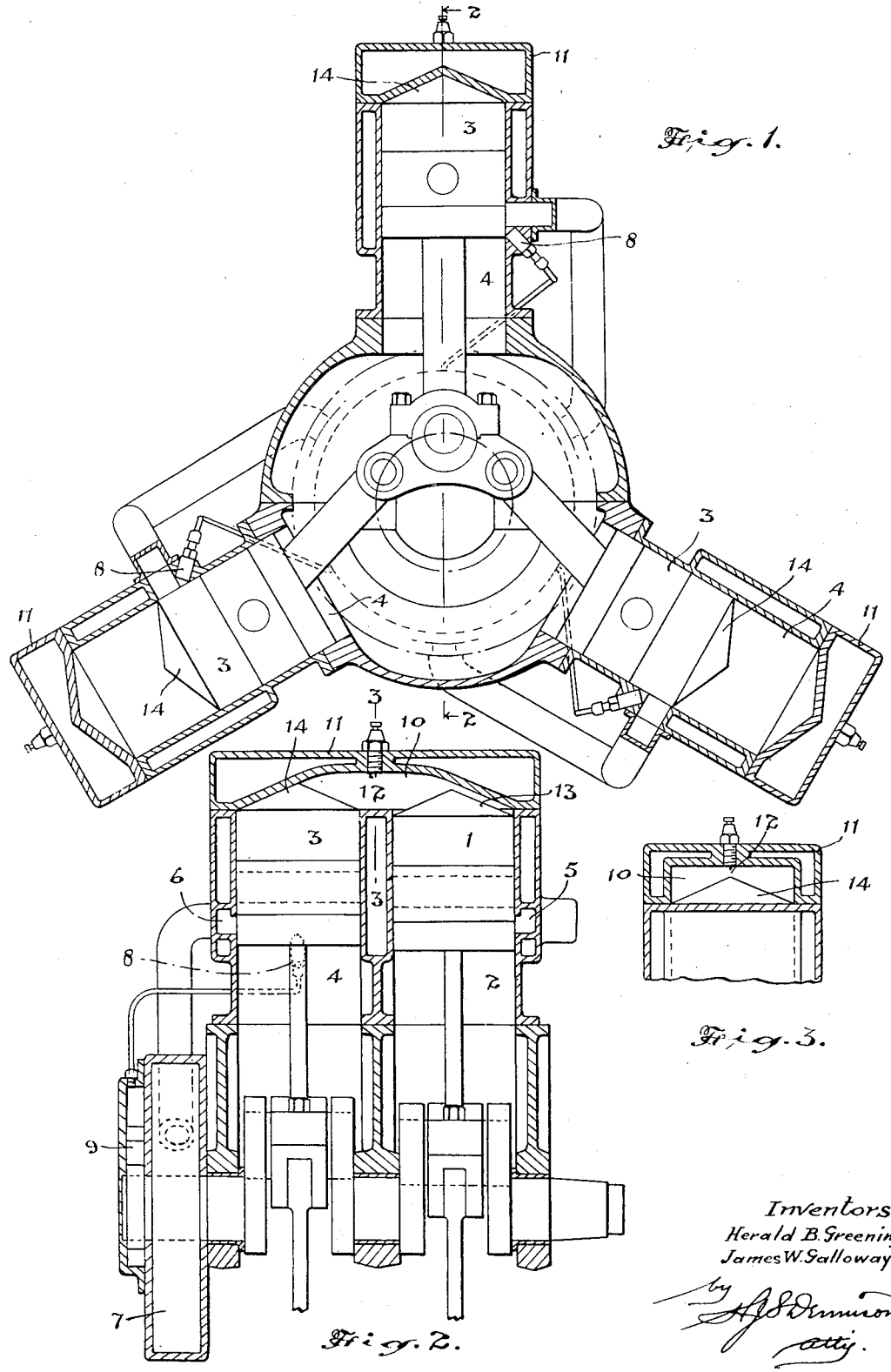

1,945,636

UNITED STATES PATENT OFFICE 1,945,636

INTERNAL COMBUSTION ENGINE

Herald B. Greening and James W. Galloway, Hamilton, Ontario, Canada, assignors to Galloway Engineering Company Limited, Hamilton, Ontario, Canada Application March 31, 1932. Serial No. 602,188

3 Claims. (Cl. 123—53)

The principal objects of this invention are, to effect a material increase in the efficiency in the two cycle type of engine and particularly in the paired cylinder unit type, obtaining the maximum charge of explosive mixture in the cylinders without loss of fuel through the exhaust ports.

The principal features of the invention consist in the novel construction and arrangement of paired cylinder units having a common combustion head with means for forcing a sweeping charge of air therethrough and means for injecting a charge of fuel into the air stream, so that an explosive charge will be created within the cylinders without loss through the exhaust ports.

In the accompanying drawing, Figure 1 is a transverse sectional view taken longitudinally through the median plane of the intake or—trailing cylinders of a radial arrangement of paired cylinders with common combustion heads.

Figure 2 is a longitudinal mid-sectional view taken through the line 2—2 of Figure 1.

Figure 3 is a transverse sectional detail taken through the line 3—3 of Figure 2.

In the ordinary operation of paired cylinder two cycle engines the flow of the products of combustion from the cylinders is effected by the opening of the exhaust port in one cylinder and the explosive mixture flows into the other cylinder through the intake port.

The inertia of the gases and turbulence caused by the inflow mixes the inflowing combustion mixture with the products of combustion, resulting in a more or less ineffective charge and many different methods of overcoming this difficulty have been proposed.

According to the present invention the piston 1 of the exhaust cylinder 2 leads the piston 3 of the intake cylinder 4 and upon the opening of the exhaust port 5 by the downward movement of the piston 1 permits the escape of products of combustion. The intake port 6 is then opened and a charge of air is introduced into the cylinder 4 under pressure from a suitable blower or supercharger 7. This charge of air entering the cylinder 4 above the piston 3 follows the products of combustion from the cylinder 4 to the cylinder 2 and follows it through to the exhaust port.

A fuel injection nozzle 8 is arranged in the wall of the intake cylinder 4 with its point of discharge preferably arranged at the port 6 and this nozzle is connected with a suitable fuel injection pump 9 which is adapted to meter the quantity of fuel injected for each operation of the piston of each pair of cylinders.

The period of injection of the fuel is regulated in accordance with the volumetric capacity of the cylinders and the speed of flow of the charge of air governed by the intake pressure and the area of the intake and exhaust ports so that the injected fuel will be carried with the flow of air from the intake to the exhaust cylinder, but will not be carried through the exhaust port before the port is closed by the outward movement of the piston 1.

The fuel being thus injected is subjected to considerable turbulence and is consequently thoroughly intermingled with the air so that a thoroughly carbureted mixture fills both cylinders and this mixture is compressed by the outward movement of both pistons to a suitable pressure preceding ignition.

It is an extremely important feature that the passage in the cylinder head connecting the twin cylinders be of a cross sectional area large enough to permit the burning gases to pass freely and for the pressure air to flow in such a manner as to completely scavenge the cylinders in the time interval allowed from the period of opening to the period of closing the exhaust port, and in order to permit such a result, the chamber 10 formed in the head 11 is of a partial conical formation extending over substantially half of each of the cylinders and is connected by a substantially rectangular passage 12 extending over the wall between the two cylinders.

In order to reduce the compression area to permit the compression of the explosive charge to a desirable pressure, the pistons 1 and 3 are provided with conical heads 13 and 14 respectively.

Where the engine is used for aircraft purposes a compression ratio of over five to one may be used.

In the type of engine herein shown the cylinders are radially arranged preferably in the manner disclosed in our previous United States Patent No. 1,811,625 dated June 23rd, 1931, but it will be readily appreciated that the invention may be applied to paired cylinders in any other desirable arrangement.

The blower or supercharger device and also the fuel injection pump and nozzle are diagrammatically shown, as such devices are known and used in other arrangements than as herein described and their particular construction does not form part of this invention.

Other features in the construction of the engine may also be varied considerably without departing from the particular elements by the means of which a novel result is achieved.

What we claim as our invention is:—

1. In an internal combustion engine, in combination, a crank shaft having a pair of cranks, a paired cylinder unit adjacent said crank shaft, one cylinder having an intake and the other an exhaust port, a common combustion head connecting the outer ends of said cylinders, pistons operating in said cylinders, connecting rods connecting said pistons with said crank shaft, an air compressor having its discharge connected with the intake cylinder and constantly maintaining air under forced pressure at the intake port whereby on the opening thereof the forced air charge is admitted to the intake cylinder to flow upwardly therein through the common head and downwardly in the exhaust cylinder to sweep the products of combustion out, a fuel injector nozzle mounted to project a charge of fuel into the forced intake flow, and means for projecting a charge of fuel through said nozzle into the continuing forced air flow after the advanced scavenging portion thereof has been admitted and at a period predetermined in relation to the closing of the exhaust cylinder so that the projected atomized fuel will completely charge both cylinders but will not escape through the exhaust port.

2. An internal combustion engine comprising in combination a crank shaft having a pair of cranks offset so that one has a slight circumferential lead over the other, a plurality of paired cylinder units each having the cylinders disposed side by side longitudinally of the shaft axis, one cylinder of each of said cylinder units being provided with an intake port only and the other cylinder of each unit being provided with an exhaust port only, common combustion heads connecting the outer ends of each pair of cylinders, valving pistons operating in said intake and exhaust cylinders, sets of connecting rods extending from the advanced and retarded cranks and cooperating respectively with the pistons of the exhaust and intake groups of cylinders, whereby the pistons of the exhaust cylinder operate with a lead over the pistons of the intake cylinders, a pressure blower operated by said crank shaft having its discharge connected to the intake ports of the intake cylinders and constantly maintaining air under forced pressure at the intake port whereby on the opening thereof the forced air charge is admitted to the intake cylinder to flow upwardly therein through the common head and downwardly in the exhaust cylinder to sweep the products of combustion out, and an injection fuel pump having its discharge connected with each of said intake cylinders and supplying atomized liquid fuel to the forced air charge to said cylinders at definite intervals after a predetermined volume of the forced pure air flow has been allowed to enter the intake cylinder.

3. An engine as claimed in claim 1 in which the pressure blower operates with a discharge capacity sufficient to maintain a manifold air pressure on the inlet port of the inlet cylinder in excess of eight pounds per square inch whereby a high compression ratio is established and thorough scavenging of the dual connected cylinders at high speed is assured.

HERALD B. GREENING.
JAMES W. GALLOWAY.